Patented May 25, 1954

2,679,294

UNITED STATES PATENT OFFICE 2,679,294

INCREASING PRODUCTION OF OIL WELLS

Donald C. Bond, Crystal Lake, and George G. Bernard, Chicago, Ill., assignors to The Pure Oil Company, Chicago, Ill., a corporation of Ohio No Drawing. Continuation of application Serial No. 50,005, September 18, 1948. This application February 26, 1952, Serial No. 273,568

10 Claims. (Cl. 166—25)

This invention relates to a method of improving the efficiency of oil recovery operations, which may or may not involve fluid injection into an earth formation to force the flow of oil into a desired formation, by increasing the permeability of certain types of strata and, in particular, sandstone strata. This application is a continuation of application, Serial Number 50,005, filed September 18, 1948, now abandoned, by the same applicants.

In oil recovery operations, methods of improving the flow of oil into an earth bore have been developed and have followed the line of acidizing the particular formation under treatment. Various acids have been used to dissolve parts of formations, thereby to increase the permeability thereof. One of the principal obstacles to efficient acidizing of wells has been the treatment of sandstone formations, because the siliceous formation containing many alkaline earth metals is not readily subject to acidizing treatments.

Hydrofluoric and fluoboric acid treatments are the only ones which are useful to any extent on sandstone formations. However, the use of hydrofluoric acid is accompanied by many hazards, not the least of which is the ability of the acid to cause severe, persistent burns when only minute amounts come in contact with the skin. A complication resulting from the use of hydrofluoric acid is that after reaction with silica or siliceous material, gelatinous fluosilicates and insoluble alkaline earth fluorides which tend to plug the treated formation are formed.

Accordingly, it is a fundamental object of the instant invention to provide a method of increasing the permeability of a given earth stratum by treatment thereof with alkali.

It is another object of the invention to provide a method of increasing the permeability of sandstone strata by the treatment thereof with hot alkali solution.

It is another object of the invention to provide a correlated alkali-acid treatment of an earth formation which will bring about a material increase in the permeability thereof by rendering the acid treatment substantially more effective than it would be alone.

Other objects and advantages of the invention will in part be obvious and in part appear hereinafter.

The invention comprises a method of increasing the permeability of an earth formation and, in particular, a sandstone formation through which an oil will pass, which involves the steps and combinations of steps having the relationship each to the other to be hereinafter described, and it is substantially characterized by injecting an aqueous alkali metal hydroxide solution at an elevated temperature into the oil well and into the stratum it is desired to open and forcing it into the formation to attack and reduce portions thereof to soluble or more permeable form. In a modification of the process, the alkali treatment of the earth stratum is followed by an acid treatment which has the effect of further attacking the formation and rendering it substantially more permeable.

Applicants are aware of United States Patent No. 2,386,605 by E. E. Harton, Jr., and Priscilla Lyon, which patent discloses that potassium hydroxide, but not sodium hydroxide, solutions are effective in disintegrating gypsum deposits in oil wells.

We have found that siliceous formations, a typical one being sandstone, can have their permeabilities materially increased by passing into and through the formations a strong caustic alkali solution at an elevated temperature. For obtaining substantial effectiveness of the process, concentrated alkali metal hydroxide solutions in the range from about 10 per cent by weight to saturation are preferred. For the treatment, elevated temperatures from about 100° F. to a temperature as high as practicable are preferred. However, any temperatures within the range from about 100° to 500°–600° F. are useful and, with present equipment, about 500°–600° F. seems to be a practicable upper limit.

Caustic solutions at temperatures of about 200° F. are useful, for substantial permeability increases ranging from 100 per cent to 500 per cent can be obtained by treatment of earth formations therewith. However, to obtain substantially complete disintegration of sandstone formations, temperatures of about 350° F. or higher are needed. Because the effectiveness of the solution is increased with elevation of temperature, operation at the highest practicable temperature is preferred.

In carrying out a caustic treatment of a well in a typical operation in accordance with the invention, therefore, a 50 per cent aqueous solution of caustic alkali is heated under pressure, to avoid vaporization, to a temperature of about 375° to 400° F. The formation to be causticized is preheated to about the same temperature or higher by the circulation of hot water or steam through it. When the caustic is to be injected, the hole or well bore is "loaded" with liquid by filling the annular space between tubing and casing with oil, water or caustic solution, so that the hot caustic solution to be injected into the formation can be forced into the stratum under pressure. This loading medium usually will be water, because it is preferred for preheating the formation to be treated. Thus, in circulating water through the formation, it is pumped down the tubing, into the formation, and returns through the annulus, with the result that the annulus will be filled with it. Hot caustic solution is then pumped under pressure down through the well tubing and into the preheated formation, where it is allowed to remain for about an hour, which is long enough to dissolve some of the formation. Before it has had time to cool below about 100° to 200° F., additional caustic solution is pumped into the formation to displace that first introduced. The total amount of caustic used will vary with the formation, but generally, 10,000 to 20,000 gallons of about 10 to 20 per cent solution will be used. The caustic solution can be kept flowing at a rate which will prevent its cooling to a temperature below about 100° F. in the formation. Upon completion of a treatment, caustic solution is removed from the well by flushing the formation with hot water or oil. When substantially all the caustic solution has been removed from the formation, acid in amount comparable to the amount of caustic used, can be introduced to accomplish such additional dissolving of the formation as may be desired.

An experimental demonstration of the effectiveness of the alkali treatment as a means for increasing the permeability of sandstone formations was carried out on a laboratory scale using sample sandstone cores. The procedure involved testing the core for permeability by measuring the rate at which the caustic solution at ambient temperature passed through it initially and the rate at which it passed through the stone in the final steps of the treatment.

Experimentally, the technique was as follows: Samples of sandstone 3 inches in diameter and 3 inches long were mounted in an apparatus which consisted of a tube fitted closely around the sample so that fluid flow had to take place through it. The tube was kept filled with the caustic solution so that samples were subjected to a positive head of alkali solution equivalent to about 200 millimeters of mercury. The rate at which alkali solution at ambient temperature passed through the sandstone prior to the test was determined by timing the collection of a measured amount. The flow of hot caustic solution was commenced and continued without interruption for the period of the test. Following the test, a sample of solution at ambient temperature was passed through the core and its rate of flow determined. These rates of flow of the solutions were taken as measures of the permeability of the stone before and after the test.

The following table summarizes results obtained in the experimental determination of the effect of the alkali metal hydroxide solutions on the permeability of the sandstone samples:

Table I

CAUSTICIZING BEREA SANDSTONE

| Test | I[1] | II[1] | $\frac{II}{I}$ | Temp., °F | Time, Hrs. | Amount KOH Liters[2] |
|---|---|---|---|---|---|---|
| 1 | 4.0 | 21.7 | 5.45 | 200 | 2 | 2.0 |
| 2 | 5.6 | 10.5 | 1.87 | 200 | 2 | 2.0 |
| 3 | 7.1 | 44.5 | 6.26 | 200 | 5 | 6.0 |
| 4 | 8.8 | 21.7 | 2.47 | 300–400 | 2 | 0.25 |
| 5 | 3.0 | 4.5 | 1.5 | 350–400 | 2 | 2.0 |
| 6 | 4.2 | 597 | 142 | 350–400 | 3 | 4.0 |
| 7 | 30.0 | 7.5 | 0.25 | 350 | 2 | (H₂O) 2.0 |
| 8 | 7.0 | 12.2 | 1.74 | 350–400 | 2 | 1.0 |
| 9 | 12.2 | 28.0 | 2.3 | 350–370 | 2 | 2.0 |
| 10 | 28.0 | 1600 | 57.2 | 350–400 | 2 | 1.4 |

[1] I—Original permeability, milliliter per minute. II—Final permeability, milliliters per minute; rate of flow of the caustic solution through the core at room temperature under 217 millimeters mercury pressure.
[2] In all tests, the concentration of the potassium hydroxide solution was 20 percent by weight, with the exception of tests 5, 6 and 7. Test 7 was a blank in which plain water was used, and in tests 5 and 6, the concentration of the potassium hydroxide solution was 50 percent by weight.

From a consideration of the initial and final permeabilities tabulated in Table I, it is apparent that a substantial increase in the permeability is obtained by the passage of the hot alkali metal hydroxide through the stone. In general, it was found that substantial quantities of material, largely silica, were dissolved by the caustic solution. When the solution cools, this solid material will separate out and this phenomenon can cause a decrease in permeability of the core. That is, excessive cooling of the solution can cause the deposition of gelatinous siliceous materials in the stone, thereby reducing its permeability. Thus, it is apparent that the maintenance of the solution at a relatively high temperature during the causticizing of the stone is important.

In test No. 6, the permeability figures show an extremely sharp increase, for the stone was attacked quite severely and disintegrated to such an extent that the solution flowed through it quite freely.

Tests of the sandstone cores with hydrochloric acid solution were made after they had been washed with water to remove alkali, and it was found that in all cases the stone which had been treated with strong caustic alkali was readily soluble in the hydrochloric acid, although the original stone itself was substantially unaffected by the hydrochloric acid.

The following data show the results of some additional tests made on sandstone cores in accordance with the technique described:

Table II

CAUSTICIZING BEREA SANDSTONE

| Test | I[1] | II[1] | $\frac{II}{I}$ | Temp., °F. | Time, Hrs. | Caustic | |
|---|---|---|---|---|---|---|---|
| | | | | | | Liters | Percent Conc. |
| 1 | 37.5 | 26.0 | 0.69 | 270 | 2 | 2 | 20–KOH |
| 1a | 26.0 | 36.0 | 1.38 | 275 | 6 | 6 | 20–KOH |
| 1b | 32.5 | 35.0 | 1.07 | 275 | 2 | 2 | 50–KOH |
| 1c | 35.0 | ∞ | ∞ | 375 | 3 | 3 | 50–KOH |
| 2 | 6.0 | 8.4 | 1.4 | 375 | 2 | 2 | 20–NaOH |
| 2a | 8.4 | ∞ | ∞ | 375 | 2 | 2 | 20–NaOH |
| 3 | 2.9 | 10.2 | 3.5 | 375 | 2 | 2 | 20–NaOH |
| 3a | 10.2 | ∞ | ∞ | 375 | 2 | 2 | 20–NaOH |

[1] I—Original permeability, milliliters per minute. II—Final permeability, milliliters per minute; rate of flow of the caustic solution through the core at room temperature under 217 millimeters mercury pressure.

In the series of tests reported in Table II, tests 1, 1a, 1b, and 1c represent successive operations on the same sample. It should be noted that successive tests 1, 1a, and 1b, carried out at 275° F., were ineffective in increasing the ultimate permeability of the sample, but that when the temperature was raised to 375° F., test 1c, the sample disintegrated rather quickly as shown by the infinite permeability figure. The effectiveness of higher temperature and higher alkali concentration is brought out in tests 2, 2a and 3 and 3a where the samples were distintegrated during the second alkali treatment.

It will be seen from this description of the experimental results and the procedure outlined for field application that we have devised a novel treatment for opening sandstone formations in oil wells, which treatment will produce an increase in the permeability thereof. In many cases, the treatment can be made drastic enough to destroy a substantial part of the formation and increase its permeability manyfold. For use in the process, alkali metal hydroxide solutions ranging in composition from 5 per cent by weight to saturation are desirable. Any of the alkali metal hydroxides are useful provided the corresponding alkali metal silicate is soluble in the concentrated hot alkali solution. However, practical economic considerations dictate the use of the more common and cheaper hydroxides, such as sodium and potassium, rather than the much more costly lithium, cesium, and rubidium hydroxides. Some advantage is found in using potassium hydroxide, but only because it is more soluble than sodium hydroxide at ordinary temperatures and it is more easily handled. Likewise, for the acid treatment following the hydroxide treatment, any of the acids commonly used to dissolve earth formations can be used. Thus, the hydrohalic acids, such as hydrochloric, hydrobromic, hydriodic, and hydrofluoric acids can be used where salts formed by reaction thereof will not complicate the process. Similarly, fluoboric acid, nitric acid, sulfuric acid, phosphoric acid, acetic acid, and other organic or inorganic acids which will form water or acid soluble salts of alkali metals and alkaline earth metals left in the formation subsequent to the alkali metal hydroxide treatment can be used. The acid concentrations are preferably selected so that the solution thereof is sufficiently concentrated to bring into the earth formation enough acid to dissolve a substantial amount of the formation and also to bring in at the same time enough water to retain in solution the salt of the acid formed by the reaction. Thus, in general it will be found that solutions in the range of about 5 to 40 per cent of the acid will be useful, with the range from about 10 to 20 per cent preferable.

Though this invention has been described with only a limited number of tests, the principle thereof is clear and the examples are to be taken merely as illustrative of the scope of the invention and not restrictive thereof.

What is claimed is:

1. A method of increasing the permeability of siliceous earth formations, comprising passing into the formation a sodium hydroxide solution at a temperature of 350° to 600° F., forcing the solution into the earth formation, thereby dissolving substantial amounts of material soluble therein, and flushing the formation to remove the sodium hydroxide solution.

2. The method in accordance with claim 1 in which the concentration of the sodium hydroxide solution is in the range from 5 per cent by weight to saturation.

3. The method of increasing the permeability of a sandstone formation, comprising forcing into the formation an aqueous sodium hydroxide solution of a concentration from about 5 per cent by weight of sodium hydroxide to saturation at a temperature of about 375° F., thereby to dissolve substantial amounts of the formation, and flushing the formation to remove the sodium hydroxide solution.

4. The method in accordance with claim 3 in which the sodium hydroxide solution is retained in the formation for at least about one hour.

5. The method of increasing the permeability of siliceous earth formations, comprising passing into the formation a sodium hydroxide solution at a temperature of 350° to 600° F., causing the solution to enter the earth formation, thereby dissolving substantial amounts of material soluble therein, flushing the formation to remove the sodium hydroxide solution and following said flushing with the injection of a mineral acid solution, thereby to dissolve additional quantities of acid-soluble materials and materials rendered acid-soluble by the treatment with sodium hydroxide.

6. The method in accordance with claim 5 in which the acid solution has a concentration of about 5 to 40 per cent of acid.

7. The method in accordance with claim 5 in which the acid is hydrochloric acid.

8. The method in accordance with claim 5 in which the acid is hydrofluoric acid.

9. The method in accordance with claim 5 in which the acid is fluoboric acid.

10. The method in accordance with claim 5 in which the sodium hydroxide solution is an aqueous solution having a concentration from about 5 per cent by weight to saturation.

References Cited in the file of this patent

UNITED STATES PATENTS

| Number | Name | Date |
| --- | --- | --- |
| 1,382,337 | Bellis | June 21, 1921 |
| 2,161,085 | Phalen | June 6, 1939 |
| 2,228,629 | Jarrell | Jan. 14, 1941 |
| 2,300,393 | Ayers | Nov. 3, 1942 |
| 2,386,605 | Harton et al. | Oct. 9, 1945 |